E. MIDDLEBROOKS.
FERTILIZER DISTRIBUTER.
APPLICATION FILED APR. 25, 1913.
1,082,037.
Patented Dec. 23, 1913.
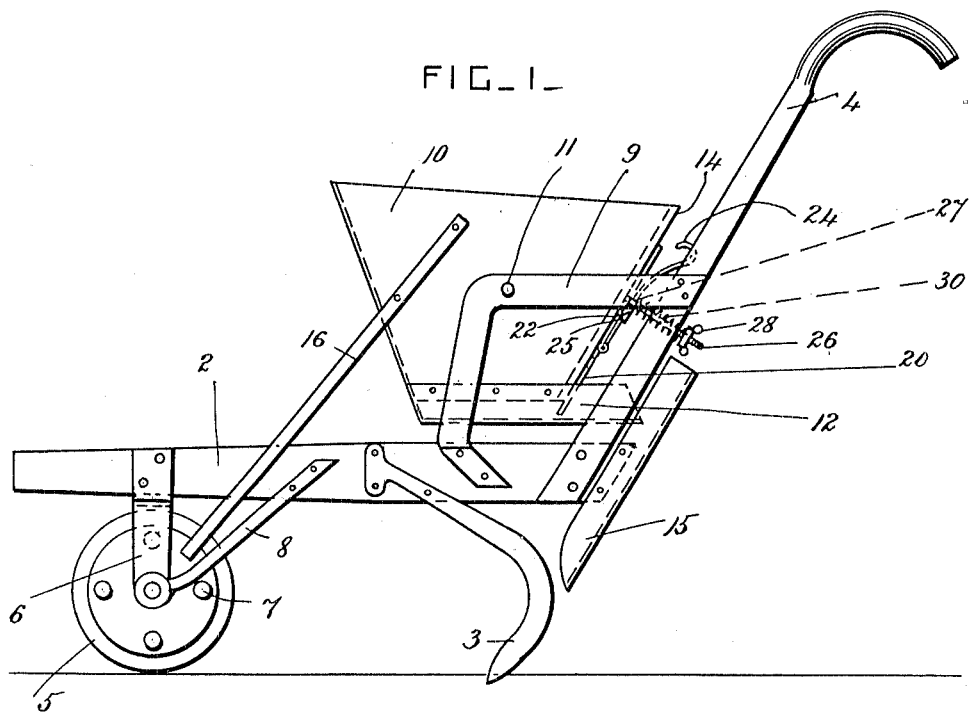
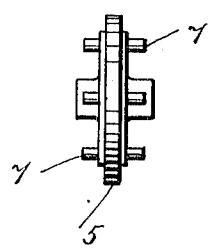
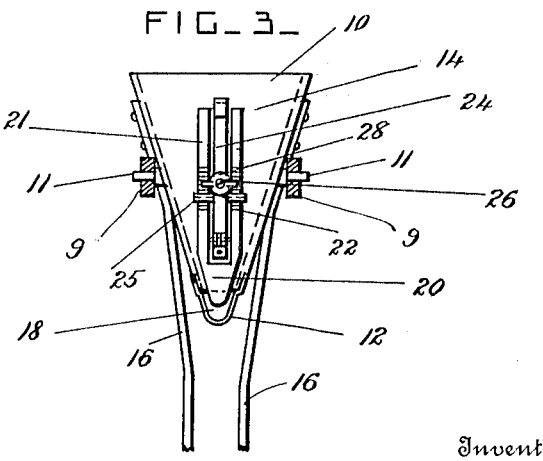

UNITED STATES PATENT OFFICE.

EUGENE MIDDLEBROOKS, OF HILLSBORO, GEORGIA.

FERTILIZER-DISTRIBUTER.

1,082,037.　　　　　Specification of Letters Patent.　　Patented Dec. 23, 1913.

Application filed April 25, 1913. Serial No. 763,544.

*To all whom it may concern:*

Be it known that I, EUGENE MIDDLEBROOKS, a citizen of the United States, residing at Hillsboro, in the county of Jasper and State of Georgia, have invented certain new and useful Improvements in Fertilizer-Distributers; and I do hereby declare the following to be a full, clear, and exact description of the invention, such as will enable others skilled in the art to which it appertains to make and use the same.

This invention relates to fertilizer distributers provided with cultivator blades, beams and ground wheels; and it consists in the novel construction and combination of the parts hereinafter fully described and claimed.

In the drawings, Figure 1 is a side view of a fertilizer distributer constructed according to this invention. Fig. 2 is a detail view of the ground wheel and knockers. Fig. 3 is a rear end view of the hopper.

A cultivator beam 2 is provided and has a cultivator blade or shovel 3 connected to its rear part, and guide handles 4, all of these parts being of any approved construction. A ground wheel 5 is journaled in a bracket or standard 6 secured to the front part of the beam in advance of the cultivator blade. This ground wheel has knocker pins or knobs 7 which project laterally from each side of it, and the bracket is provided with stays 8 which brace it to the beam.

Angle-shaped supporting brackets 9 are secured to the beam and to the handles, and a hopper 10 for the fertilizer is pivoted by pins 11 between these brackets so that it is free to rock pivotally. These angle-shaped brackets brace the handles to the beam, and the pivots 11 are arranged at the middle parts of the brackets adjacent to the angles.

The hopper 10 has a rearwardly projecting discharge spout 12 secured to its bottom, and this spout projects beyond its rear side 14, into the channel of a downwardly and forwardly inclined distributing spout 15. The spout 15 is secured to the rear end of the beam, and it receives the fertilizer from the spout 12 and distributes it on the ground close behind the cultivator blade. Knocker bars 16 are secured to the sides of the hopper, and are arranged in forwardly and downwardly inclined positions so that their front end portions can be struck or tripped by the knocker pins 7 as the ground wheel is revolved. The hopper is mounted on its pivot pins so that the knocker bars descend by gravity after they have been tripped or struck by the knocker pins to oscillate the hopper.

The spout 12 is open at 18 below the rear side 14 of the hopper, and a discharge plate 20 is secured against the side 14, and is arranged to vary the discharge opening of the spout by projecting to a greater or less extent into the spout. The upper part of the plate 20 has a longitudinal slot 21 cut in it, and notches or corrugations 22 are formed in the plate at the sides of this slot, and extend crosswise of the plate.

A spring-actuated clamping-handle 24 is hinged to the rear side 14 of the hopper, in the lower part of the slot, and has cross-pieces 25 at its middle part which engage with the notches 22 and hold the plate 20 in any desired position.

A pin 26 is secured to the rear side 14 of the hopper, and projects through a hole 27 in the handle. The rear end portion of this pin 26 is screwthreaded, and is provided with a thumb-nut 28, and 30 is a spring interposed between the thumb-nut and the handle.

The fertilizer is fed from the hopper as the machine is drawn along by the action of the knocker mechanism which oscillates the hopper and allows the fertilizer to run from it in a stream which is regulated by the discharge plate, and which stops when the machine stops.

What I claim is:

In a fertilizer distributer, the combination, with a cultivator beam provided with a ground wheel and a cultivator blade, of a hopper pivotally supported from the beam and provided with a discharge spout, knocker mechanism for oscillating the hopper from the ground wheel as the machine is drawn along, an adjustable discharge plate having a longitudinal slot in its upper part and cross-notches at the sides of the slot, said plate being arranged against the rear side of the hopper and projecting into its discharge spout, a retractable handle having its lower end hinged to the rear side of the hopper and arranged in the slot of the discharge plate, said handle having a hole in its middle part and having crosspieces adjacent to the hole, a pin projecting from the hopper and arranged in the said hole and provided with a nut at its free end portion, and a spring encircling the pin between the handle and the nut and holding the crosspieces in engagement with the notches of the discharge plate.

In testimony whereof I have affixed my signature in the presence of two witnesses.

EUGENE MIDDLEBROOKS.

Witnesses:
J. F. TURNER,
G. K. GORLAND.

Copies of this patent may be obtained for five cents each, by addressing the "Commissioner of Patents, Washington, D. C."